May 7, 1957 P. M. SCHMITT 2,791,246
WORK HOLDER
Filed March 26, 1954 4 Sheets-Sheet 4
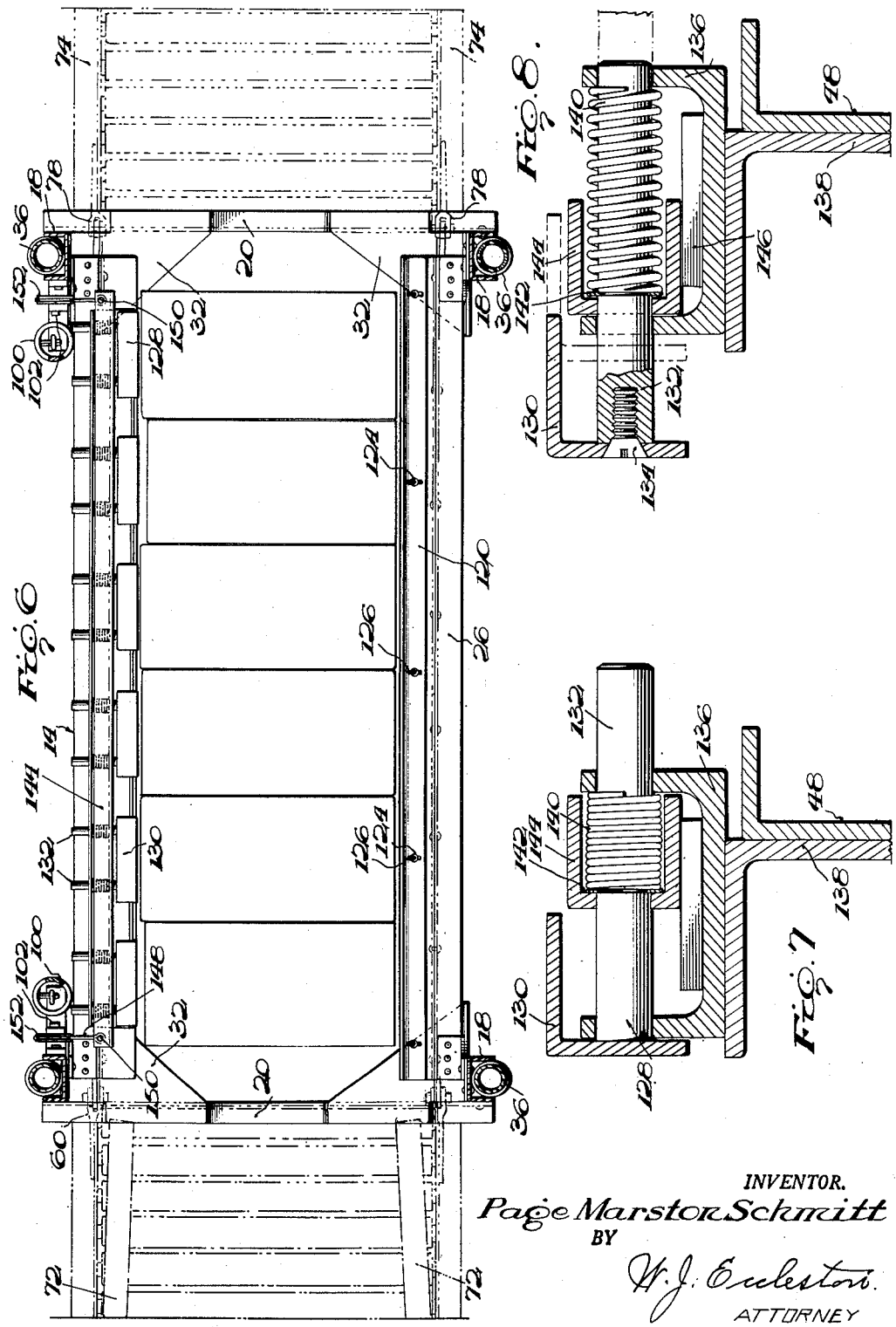
INVENTOR.
Page Marston Schmitt
BY
W. J. Eccleston.
ATTORNEY United States Patent Office 2,791,246
Patented May 7, 1957

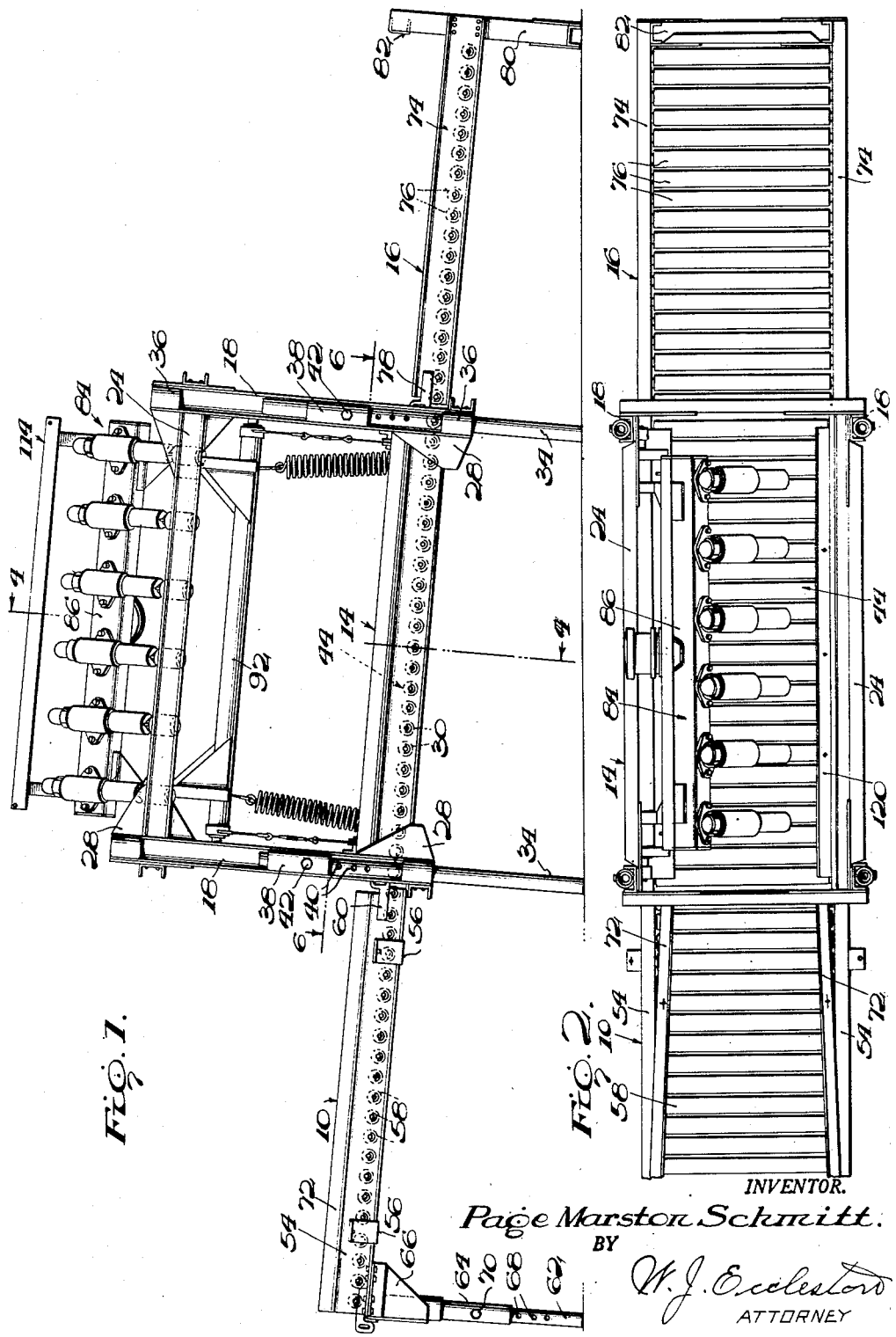

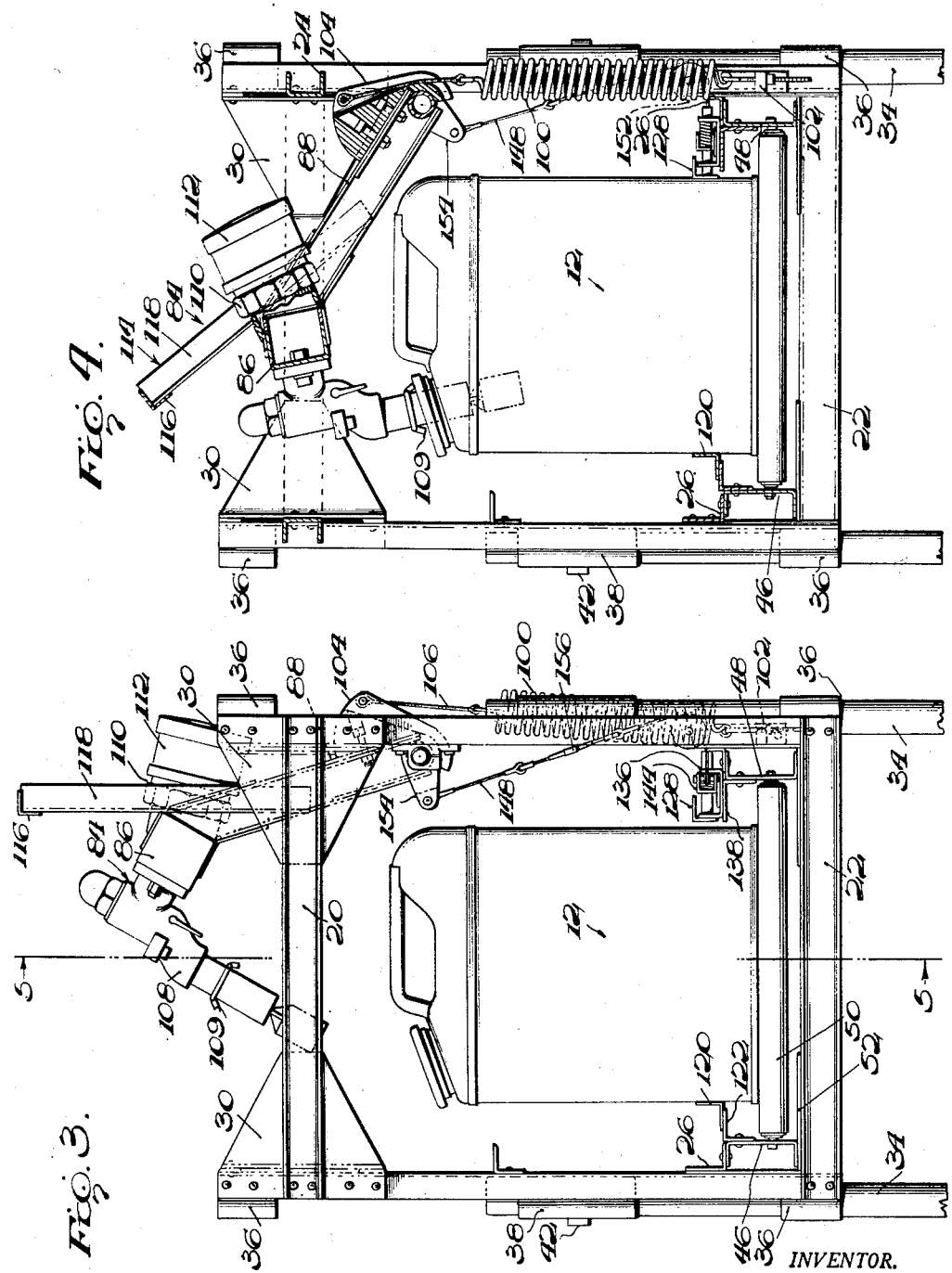

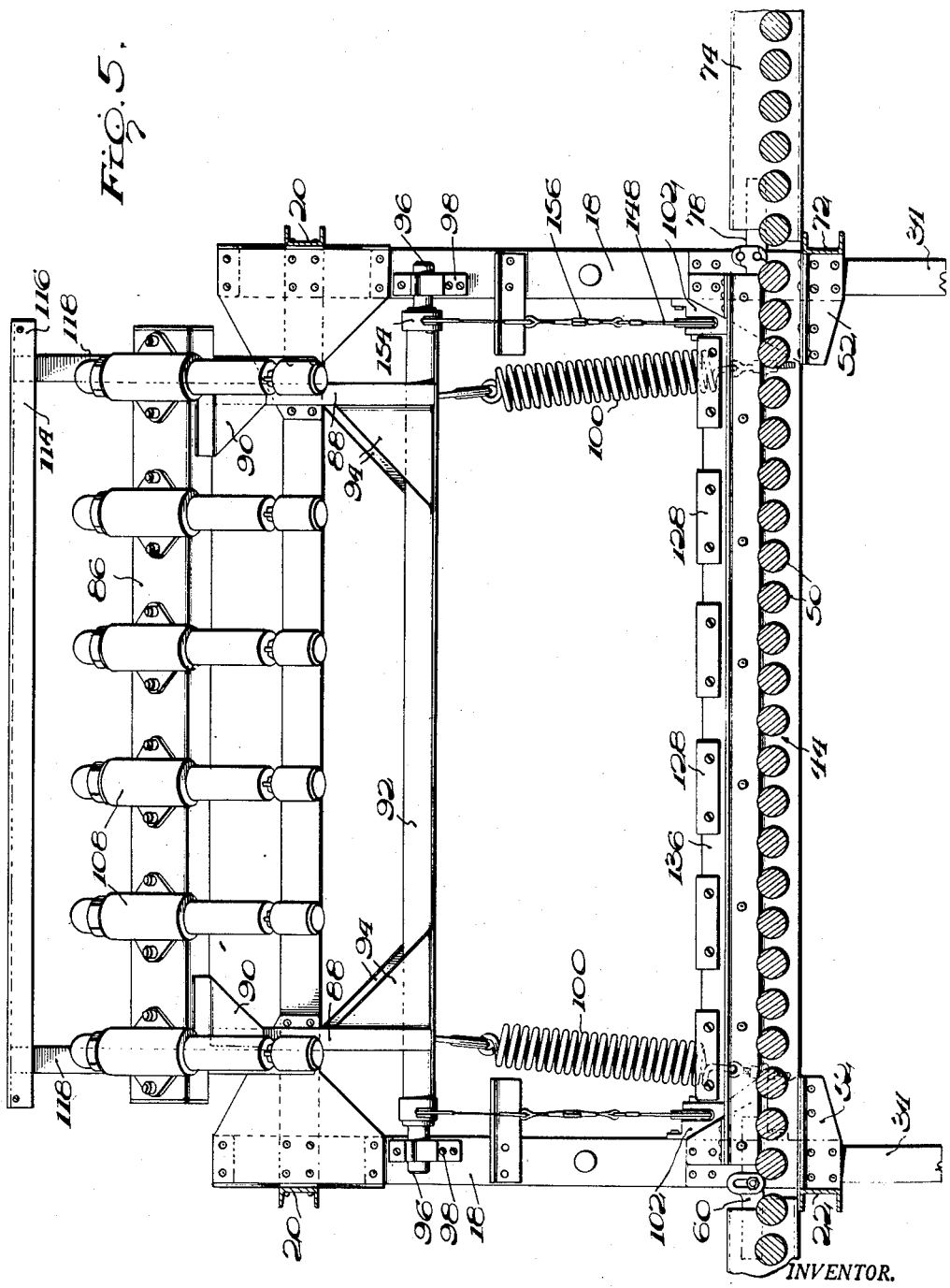

2,791,246

WORK HOLDER

Page Marston Schmitt, Kensington, Md.

Application March 26, 1954, Serial No. 418,879

16 Claims. (Cl. 141—237)

The present invention relates to an object positioning and holding mechanism and more particularly to an improved mechanism for aligning a plurality of duplicate objects or parts at a predetermined position in a side-by-side longitudinally extending series.

An object of the invention is to provide a new and improved mechanism for positioning and holding a plurality of duplicate objects or parts side-by-side including mechanism for yieldably urging the parts to a predetermined position independently of each other.

Another object of the invention is to provide a new and improved positioning and holding mechanism including members individual to the objects or parts to be held independently to bias the latter to a predetermined position and mechanism for rendering the individual biasing members inoperative substantially simultaneously.

A further object of the invention is to provide improved means for positioning and rigidly holding a plurality of duplicate objects or parts side-by-side in which individual clamping members are provided for the individual objects or parts to be held and the clamping force is produced by individually spring loading the clamping members.

A still further object of the invention is to provide a new and improved machine having an operating head for simultaneously operating upon a plurality of duplicate parts and improved means to position a plurality of duplicate objects or parts to be operated upon at a predetermined side-by-side position longitudinally of an operating station in the machine along with a counterbalancing mechanism to bias the operating head of the machine to a predetermined position but permit adjustment thereof longitudinally of the operating station.

Yet another object of the invention is to provide a new and improved machine for simultaneously operating on a plurality of duplicate objects or parts including a gravity feed conveyor system from the lower end of which parts may be backed up properly to position the same side-by-side longitudinally of the machine.

A broad object of the invention is to provide a new and improved positioning and holding mechanism for use in a machine for simultaneously operating on a plurality of duplicate objects or parts and mechanism automatically to operate said positioning and holding mechanism in timed relation to the operating cycles or phases of the machine to insure rigid positioning of the parts while the machine is operating on the objects or parts.

Another object of the invention is to provide a new and improved mechanism particularly designed for use in a machine for simultaneously filling a plurality of the so-called 5-gallon Blitz cans in common use by the Armed Forces for transporting liquid fuels and water.

A general object of the invention is to provide a container filling machine of knock-down construction which is relatively inexpensive to construct, easy to assemble and disassemble and operate and which is sufficiently sturdy to withstand the rough usage to which it may be subjected by the Armed Forces in the field.

These and other objects, advantages, and capabilities of the invention will become apparent from the following description and accompanying drawings in which:

Fig. 1 is a side elevational view of that side of a machine incorporating the improved positioning and holding mechanism of the present invention on which an operator of the machine normally will be stationed;

Fig. 2 is a top plan view of the machine shown in Fig. 1;

Fig. 3 is an end view of the right end of the machine shown in Fig. 1 on a slightly enlarged scale compared to that view showing the operating mechanisms for the machine in inoperative position;

Fig. 4 is a view partly in section on the plane of the line 4—4 of Fig. 1 showing the operating mechanisms in operative position;

Fig. 5 is a view partly in vertical section of the dispensing machine on the plane of the line 5—5 on Fig. 3 when viewed in the direction of the arrows on that line;

Fig. 6 is a horizontal sectional view on an enlarged scale taken on the plane of the line 6—6 of Fig. 1;

Fig. 7 is a fragmentary end elevational view on an enlarged scale of a clamping mechanism forming part of the present invention showing the parts in inoperative position, and Fig. 8 is a view similar to Fig. 7 but partly in section and showing the parts in extended position.

For the purpose of illustrating one application or embodiment of the present invention, there is shown in the drawings a machine particularly adapted for simultaneously filling six 5-gallon so-called Blitz cans used by the Armed Forces for transporting water and liquid fuels. As best seen in Figs. 1 and 2, this machine comprises three sections or stations, namely, a loading station 10 at which Blitz cans or containers 12 are loaded onto the machine, a filling or operating station 14 at which the containers are filled, and a discharge station 16 at which the filled containers are unloaded from the machine. The operating station 14 which includes most of the mechanisms of the machine comprises an open rectangular framework of structural irons including rectangularly disposed vertically extending channel-shaped uprights 18 fixed in spaced relation by upper and lower cross pieces 20 and 22, respectively (Figs. 3 and 5) and by longitudinally extending side rails including channel irons 24 welded, riveted, or otherwise fixedly anchored to the uprights 18 adjacent their upper ends and angle irons 26 likewise suitably fixed to the uprights adjacent their lower ends. This framework is reinforced by suitably located gusset plates at the joints between these various members such as the gusset plates 28, 30, and 32 shown in Figs. 1, 3, and 6, respectively, for example.

The framework is supported upon four tubular legs 34 releasably anchored to the four vertical uprights 18 so that the height at which the framework is supported may be varied. The anchoring means for each leg comprises a pair of collars 36 rigidly anchored to the outer side of the uprights 18 adjacent the upper and lower ends thereof and a sleeve 38 coaxially arranged with respect to the collars fixedly secured to the uprights midway between the collars 36. The legs 34 telescope freely through the collars 36 and sleeve 38, and each leg is provided with a series of axially spaced apertures 40 extending diametrically therethrough which may be aligned with diametrically opposite apertures in the sleeves 38 so that bolts 42 may be passed through these aligned apertures to lock the legs 34 against endwise movement. By virtue of this construction, the legs may be individually adjusted to accommodate the machine to uneven terrain or supporting surfaces and to vary the end-to-end inclination thereof.

Supported in the lower portion of the filling or operating station framework is a longitudinally extending roller conveyor 44 comprising oppositely disposed longitudinally extending channel-shaped side rails 46 and 48 (Fig. 3) in which a plurality of conventional conveyor rollers 50 are journaled. For convenience in description, the side of the operating station 14 at which the operator stands when the machine is in use, i. e., the left side of Figs. 3 and 4, will be designated the near side of the operating station and the opposite side will be designated the far side. The side rails 46 and 48, respectively, rest adjacent opposite ends upon brackets 52 (Figs. 3 and 5) and are also connected to the angular side rails 26 to rigidify the entire framework. The roller conveyor thus formed provides a support for the containers 12 while they are being filled, in addition to providing a means for transporting containers to and from filling position.

Preferably, the operating or filling station framework and the roller conveyor 44 are of the proper length to support a predetermined number of containers in side-by-side relation, for example, six containers as shown in the drawings.

Containers are transported to this filling station by the loading station 10 which comprises a pair of channel shaped side rails 54 (Figs. 1 and 2) laterally spaced from each other by suitable cross pieces 56 adjacent opposite ends thereof in which a plurality of conveyor rollers 58 are journaled. The forward end of the loading station is supported from the framework of the operating station 14 to which the side rails 54 are detachably connected by releasable connections shown more or less diagrammatically at 60 in Figs. 1 and 6 which may be of conventional construction.

The opposite or rear end of the loading station 10 is supported upon a pair of vertically adjustable legs, one of which is shown at 62 in Fig. 1. These legs telescope freely in tubular sleeves fixed to the opposite rear corners of the loading station by suitable gusset plates. One of these sleeves is shown at 64 in Fig. 1, and a gusset plate 66 for securing the same in position is also shown. The legs are provided with a plurality of axially spaced diametrically disposed apertures 68 for passing an anchor bolt 70 which also passes through the sleeve 64 to lock the leg at desired positions of adjustment. Thus, the elevation of the rear end of the loading conveyor or station 10 may be adjusted in accordance with variations in the elevation of the operating station 14 or in the terrain over which these two stations are located. Suitably supported above the conveyor rollers 58 is a pair of guide rails 72 for directing containers from the loading station 10 onto the roller conveyor in the operating station 14. Preferably, the side rails 72 are laterally adjustable at least at their forward ends so that they may be inclined as shown in Fig. 2 and thus will funnel containers into the operating station 14.

The discharge station 16 also comprises a pair of side rails 74 (Figs. 1 and 2) laterally spaced by suitably located crosspieces (not shown). Journaled in the side rails 74 is a plurality of conveyor rolls 76. At its forward end the discharge station 16 is supported from the framework of the filling station 14 to which the side rails 74 are connected by any suitable detachable connection, such as that shown diagrammatically at 78 in Figs. 1 and 5. The rear end of the unloading station is supported by legs 80 of fixed length which extend upwardly of the side rails 74 and have a crosspiece 82 secured thereto to form a stop against which containers may be backed up. For a purpose to be described, the discharge station 16 preferably should correspond in length to the length of the operating station 14 so that these two stations are capable of holding the same number of containers 12 side by side, but if this discharge station is made of a different length, it should correspond to the length of the space occupied by a whole number of containers for a purpose which will become apparent when the operation of the machine is described.

Supported by the framework of the operating station is a filler-head 84 (Figs. 3 to 5) comprising an elongated hollow header or manifold 86 fixed at opposite ends to a pair of rocker arms 88 by means of gusset plates 90 (Fig. 5) welded to the manifold and the rocker arms. At their opposite ends, the arms 88 are fixed to a hollow shaft 92 in radially disposed relation to the shaft by means of gusset plates 94 welded to the arms and to the shaft. This shaft is rockably supported upon trunnions 96 (Fig. 5) fixed to opposite uprights 18 on the far side of the framework of the operating station by means of anchor blocks 98 mounted upon these uprights. The operating or filler-head 84 is thus rockably supported in the operating station.

Counterbalancing springs 100 lightly bias the filler-head 84 to the inoperative position shown in Figs. 3 and 5. At their lower ends, these springs are adjustably secured to mounting blocks 102 secured to the far side of the framework of the filling station, provision being made so that springs can be adjusted upwardly or downwardly to vary the force exerted thereby on the filler-head 84. At their upper ends these springs are connected to a pair of cams 104 (Figs. 3 and 4) fixed to the lower ends of the rocker arms 88 by means of cables 106 secured to the cams 104 at a position to expand the springs 100 when the filler-head 84 is rocked downwardly to the filling position shown in Fig. 4. It will be noted in Figs. 1 and 5 that the lower ends of the springs 100 are spaced from each other a greater distance than the spacing of the cams 104. As a result, oppositely directed angular forces of substantially equal magnitude are applied to the shaft 92 adjacent its opposite ends. The shaft 92 which is free to slide axially on the trunnions 96 to a limited extent is thus maintained centered with respect to the operating station. Nevertheless, by applying force to the filler-head 84, this entire assembly may be moved forwardly or rearwardly to a limited extent for a purpose to be described.

Fluid fuel is dispensed from the manifold 86 to the containers 12 through a series of equally spaced dispensing nozzles 108 (Fig. 5) fixed to the near side of the manifold 86 and communicating with the interior thereof. These nozzles preferably are of the type conventionally known as barrel fillers. Nozzles of this type are of known construction being shown for example, in U. S. Patent No. 1,400,275. They include valve mechanism which is manually operated to initiate flow of fluid therethrough after the nozzle has been moved to dispensing position and automatically operable float operated means to discontinue the flow of fluid therethrough when the fluid in the containers being filled reaches a predetermined level. A stop 109 on each nozzle limits the extent to which it may enter a container.

Liquid is admitted to the manifold 86 through an inlet fitting 110 (Figs. 3 and 4) which may be connected to a suitable source of liquid fuel under pressure by a flexible conduit (not shown) detachably connected to the inlet fitting. The latter is provided with a readily removable cap 112 to prevent the entry of foreign material into the manifold 86 when the device is not in use.

Rocking of the filler-head 84 between the inoperative position shown in Fig. 3 and the dispensing or operative position shown in Fig. 4 is facilitated by an operating handle 114 comprising a longitudinal bar or handgrip 116 and a pair of arms 118 fixed at opposite ends, respectively, to bar 116 and the rocker arms 88 by welding or any other suitable means. The filler-head assembly may also be moved forwardly or rearwardly by applying properly directed forces to the handle 114.

To assure positioning of a plurality of side-by-side duplicate containers 12 transversely of the filling station 14 properly to receive the nozzles 108 in the filling openings therein, the improved positioning and clamping mechanism now to be described has been devised. This positioning mechanism comprises a fixed stop or abutment on the near side of the machine consisting of an angle iron 120 (Figs. 3, 4, and 6) extending longitudinally of the operating or filling station 14 and supported from the channel 46 by an angle iron 122. The fixed abutment 120 and its supporting angle 122 preferably are connected together by a plurality of bolts 124 (Fig. 6) which pass through transverse slots 126 in the fixed abutment 120 so that the latter may be adjusted transversely of the operating station. Containers on the operating station conveyor 44 are forced into abutting engagement with this fixed abutment 120 by a series of clamping members 128 (Figs. 5 to 8) of duplicate construction, one of these clamping members being provided for each container the filling station conveyor 44 is capable of supporting. These clamping members each comprise an angular clamp shoe 130 fixed to a pair of cylindrical guide rods 132 (Fig. 6) by means of screws 134 (Fig. 8) each having a head countersunk in the depending flange of the clamp shoe 130.

A clamping member support in the form of a channel 136 extending longitudinally of the operating station 14 on the far side thereof is provided in which the guide rods 132 are reciprocably mounted for movement toward and from the fixed abutment 120. Channel 136 is supported from the lower siderail 48 by means of a series of angle brackets 138 or an angle iron extending the full length of channel 136, and the clamping members 128 are biased toward the fixed abutment 120 by expansion springs 140. One of these springs is mounted on each guide rod 132 and they react respectively against the far flange of the supporting channel 136 and a fixed stop on the guide rods 132 consisting of a spring clip 142 (Fig. 7) fixed in the guide rod.

The clamping members 128 are simultaneously retracted from extended position by a retracting member 144 extending from end-to-end of the series of clamping members which may be of channel shape as shown in Fig. 7 or of any other shape that will provide a rigid crossbar structure. The web of the retracting member is apertured freely to pass the guide rods 132, and it is confined between the front flange of supporting channel 136 and the spring clips 142 against which the expansion springs 140 react. Thus, when the retracting member 144 is drawn to the right from the position shown in Fig. 8 the clamping members 128 are all drawn backwardly simultaneously from extended or operative position against the opposition of the springs 140.

When the retracting member 144 is fully retracted as shown in Fig. 7, there should be a slight clearance between the depending flange on the clamp shoe 130 and the rear flange of the supporting channel 136. As the retracting force on the retracting member 144 is relaxed each of the clamping members moves to the left (Fig. 7) under the influence of the springs 140 carrying the retracting member in the same direction.

In the event of arrest of movement of one or more but less than all of the clamping members 128 as they are moving under the influence of springs 140, those clamping members not arrested and the retracting member 144 may continue to move forward under the influence of the springs acting on the unobstructed clamping members due to the loose or lost motion connection between the clamping members and the retracting member. Thus, should certain of the containers be of slightly greater width than others in a direction transverse to the operating station the clamping members for these narrower containers will be free to move forward sufficiently to clamp these narrower containers against the fixed abutment 120.

The retracting member 144 is retracted to inoperative position in timed relation to the movement of the filler head 84 by a pair of cables 148 attached at one of their ends, respectively, to the opposite ends of the retracting member 144 by any suitable connection such as a bolt 150 (Figs. 3 and 6) extending through opposite flanges on the retracting member. These cables are trained over duplicate sheaves 152 pivotally supported by the mounting blocks 102 for the counterbalancing springs 100; and they have their opposite ends fixed to crank arms 154 fixed upon the opposite ends of the rockable filler-head shaft 92. Preferably, a turnbuckle 156 is provided in each cable 148 for adjusting the end-to-end length of these cables so that the retracting member 144 will be fully retracted as shown in Figs. 3 and 7 when the filler-head 84 is raised to the inoperative position shown in Fig. 3.

In setting up the machine for use, the legs 34 and 62 on the filling or operating station 14 and the loading station 10, respectively, are so adjusted that the continuous roller conveyor formed by the loading, operating and discharge stations inclines downwardly from the loading to the discharge end thereof sufficiently to cause containers whether empty or filled, to gravitate forwardly from the loading to the discharge station and to back up against the stop 82 at the end of the discharge station. When the number of containers backed up on the discharge station is sufficient to fill the same these backed up containers form a stop preventing forward movement of containers on the operating station during a filling operation. Initially, it will be necessary to use empty containers on the discharge station as a stop for the containers on the operating station or otherwise hold the first series of containers at that station during filling. Once the first series of containers has been filled and allowed to gravitate onto the discharge station, loading of the operating station with the proper number of containers for a filling operation can be effected automatically thereafter by removing from the discharge station the number of filled containers that the operating station is designed to hold. For this reason, the discharge station preferably is designed to hold the same number of containers as the operating station, although it may be of another length provided it holds only some definite whole number of containers so that it will not be possible for a container to be located partly on the discharge station and partly on the operating station. Thus, the last container on the discharge station will always be in a position to form a stop for the containers on the operating station.

Normally the filler-head 84 is maintained in the raised or inoperative position shown in Fig. 3 by the counterbalancing springs 100. While this position of the filler-head is maintained, the clamping members 128 are maintained fully retracted as seen in Figs. 3 and 7. As a result, containers may pass freely into or out of the operating or filling station 14. Assuming the manifold 86 is connected to a source of fluid under pressure such as gasoline, and that a sufficient number of containers are backed up on the roller conveyor system to position six containers side by side at the filling station, then while the filler-head 84 is being lowered from the inoperative position shown in Fig. 3 toward the dispensing or operative position shown in Fig. 4, the crank arms 154 will be rocked counterclockwise as seen in those views so that tension in the cables 148 is relaxed and the retracting member 144 thus released. Thereupon, the springs 140 expand forcing both the retracting member 144 and the clamping members 128 to the left sufficiently to bring the clamping members individually into engagement with the individual containers 12 at the filling station 14 and to push the same into firm abutting engagement with the fixed abutment 120. This will happen at about the time the dispensing nozzles 108 begin to enter the filling openings in the containers 12 so that these openings are properly positioned to receive the nozzles. The extent to which the nozzles 108 enter the containers 12 is controlled by the stops 109 thereon, and since these nozzles include automatically operable valves to discontinue flow through the nozzles when the liquid reaches a predetermined level in the containers, a minimum of attention to the machine is required by its operator. Moreover, should some containers accidentally or for any other reason fill more rapidly than others, no harm will be done because overflowing from such containers will not occur, After the series of containers at the filling station has been filled, the filler-head 84 is rocked upwardly by the operator from the position shown in Fig. 4 to the position shown in Fig. 3, thus rocking the crank arms 154 clockwise so that tension is applied to the cables 148. As a result, a retracting pull is applied to both ends of the retracting member 144 and it is drawn to the right (Fig. 4) substantially simultaneously to retract all of the clamping members 128 to the position shown in Figs. 3 and 7. It will thus be seen that a clamping mechanism has been provided which is rendered operative or inoperative automatically in accordance with the movement of the filler or operating head between its operative dispensing position and its inoperative position without any effort being required by the operator. This greatly simplifies operation of a machine having the present positioning and holding mechanism incorporated therein.

After the containers 12 at the filling station have been filled, containers equal in number to the total number of containers that may be stationed at the filling station 14 at any one time are removed from the discharge station 16. As containers are removed from the latter station, others gravitate forwardly to take their place so that loading of the filling station occurs automatically assuming the loading station 10 has been loaded with empty containers. Thus, filling of containers is greatly simplified so that a simple procedure for filling may be practiced requiring a minimum number of operators.

Should the position of the series of backed up containers on the filling station 14 for any reason vary slightly in a forward or rearward direction relative to the direction of movement of the containers through the machine, the entire filler-head assembly 84 may be moved forwardly or rearwardly by virtue of the telescopic mounting of the hollow rockshaft 92 on the trunnions 96 and the particular manner in which the counterbalancing springs 100 are mounted. Nevertheless, this entire assembly is normally maintained centered relative to the filling station by reason of the fact that the components of force exerted on the operating head in a forward and rearward direction by the counterbalancing springs 100 are substantially equal but oppositely directed.

Because the clamping members 128 have individual springs 140 for independently moving the same into the individual containers at the filling station and the clamping members are independently movable, firm clamping of each container at that station is assured when the operating head is moved to operative position, even though the containers may vary slightly in transverse dimensions. This variation has been shown in Fig. 6 where the containers are shown in outline, although the clamping members are retracted in this view.

As previously explained, the loading station 10 and discharge station 16 are detachably connected to the framework of the operating station 14 so that they may be readily disconnected therefrom. Moreover, the legs 34 on the filling station and the legs 62 on the loading station are detachably connected thereto so that they may readily be adjusted vertically or even removed therefrom should that be desired. As a result, the machine may be quickly assembled or disassembled and the removable parts, i. e., the loading station 10, discharge station 16 and the legs 34 and 62 are designed to be packed in the framework of the operating station 14 to form a compact unit for shipment or storage.

Although the principles of the invention are described herein as applied to a container filling machine, it is to be understood that use thereof is not intended to be so limited in view of the fact that with slight modfications the invention could be used in any device where a plurality of duplicate parts are to be simultaneously operated upon by an operating head and the latter and the parts to be operated upon are relatively movable into and out of operating relationship, such as a drill press for simultaneously drilling a plurality of duplicate parts. Moreover, the invention is not to be limited to a device in which parts are fed forwardly by gravity since it could be utilized in a device provided with a manual or mechanical forward feeding mechanism.

It is also to be understood that numerous other variations and modifications may be made without departing from the underlying principles of the invention. I, therefore, desire, by the following claims, to include within the scope of the invention all such variations and modifications by which substantially the results of the invention may be obtained by the use of substantially the same or equivalent means.

I claim:

1. A machine for simultaneously operating upon a series of duplicate parts disposed in side-by-side relation comprising an operating head, mechanism to bring the operating head into and out of operating relationship with all of the parts in the said series of duplicate parts simultaneously, clamping means including yieldable members individual to the duplicate parts individually to apply clamping force thereto, means for opposing the clamping action of said individual clamping members substantially simultaneously to move the same out of clamping engagement with said duplicate parts, and means for actuating said individual clamping member opposing means upon predetermined relative movement between the duplicate parts and operating head.

2. A machine for simultaneously operating upon a series of duplicate parts disposed in side-by-side relation comprising an operating head, mechanism to bring the operating head into and out of operating relationship with all of the parts in the said series of duplicate parts simultaneously, relatively movable clamping members including members individual to the duplicate parts individually to apply clamping force to one side thereof and a single member substantially coextensive with the series on the side thereof opposite that to which clamping force is applied by said individual clamping members, means for moving said clamping members relatively into and out of clamping position including yieldable means individually to urge the individual clamping members to clamping position, means for opposing the clamping action of said individual clamping members, and means to actuate said individual clamping member opposing means upon predetermined relative movement between the duplicate parts and operating head.

3. A machine for simultaneously operating upon a series of duplicate parts disposed in side-by-side relation comprising an operating head, mechanism to bring the operating head into and out of operating relationship with all of the parts in the said series of duplicate parts simultaneously, relatively movable clamping members including members individual to the duplicate parts individually to apply clamping force to one side thereof and a single member substantially coextensive with the series on the side thereof opposite that to which clamping force is applied by said individual clamping members, means for moving said clamping members relatively into and out of clamping position including yieldable means individually to urge the individual clamping members to clamping position, means for opposing the clamping action of said individual clamping members substantially simultaneously, and means to actuate said individual clamping member opposing means upon predetermined relative movement between the duplicate parts and operating head.

4. In a machine for operating upon parts at a predetermined operating station in the machine the combination comprising an operating head, mechanism to bring said operating head and a part at said operating station in the machine into and out of operating relationship, a fixed abutment adjacent one side of the operating station, a movably mounted clamping member, yieldable means to urge said clamping member into engagement with the said part at said station on the side thereof opposite that opposed to said fixed abutment with sufficient force firmly to clamp the part against said fixed abutment, means for moving said clamping member in opposition to the biasing force exerted thereon by said yieldable means, and means to actuate said means for opposing the said yieldable means in timed relation to withdrawal of the operating head and part from operating relationship.

5. A work holder for fixedly positioning a predetermined number of duplicate parts disposed in side-by-side relation longitudinally of an operating station comprising a fixed abutment extending longitudinally of the operating station adjacent one side thereof, individual clamping members of duplicate construction for each of the parts adapted to be stationed at said operating station and mounted to move into and out of operative engagement with the said parts on the side thereof opposite that opposed to said fixed abutment, yieldable means independently to urge said clamping members into engagement with the said parts at said station with a force sufficient to clamp the said parts firmly against said fixed abutment, and means to disengage said clamping members from the said parts substantially simultaneously.

6. A work holder for fixedly positioning a predetermined number of duplicate parts disposed in side-by-side relation longitudinally of an operating station comprising a fixed abutment extending longitudinally of the operating station adjacent one side thereof, individual clamping members of duplicate construction for each of the parts adapted to be stationed at said operating station and mounted to move into and out of operative engagement with the said parts on the side thereof opposite that opposed to said fixed abutment, yieldable means independently to urge said clamping members into engagement with the said parts at said station with a force sufficient to clamp the said parts firmly against said fixed abutment, and clamping member releasing means including a crossbar constrained to move toward and from said fixed abutment and having a connection with each of said individual clamping members effective to release the same from clamping engagement with the said parts substantially simultaneously upon predetermined movement of the crossbar.

7. A work holder for fixedly positioning a predetermined number of duplicate parts disposed in side-by-side relation longitudinally of an operating station comprising a pair of fixed rails extending in parallel relation longitudinally of said operating station spaced from each other a sufficient distance freely to pass said parts therebetween, duplicate clamping members corresponding in number to the number of duplicate parts which may be stationed at said operating station supported in one of said rails for independent reciprocatory movement toward and from the other at positions longitudinally of the operating station to bring the clamping members individually into and out of operative engagement with individual parts at said operating station when the clamping members are reciprocated, resilient means independently to urge the clamping members toward the rail opposite thereto with sufficient force firmly to clamp parts against the said opposite rail, and means for retracting said clamping members in opposition to said resilient means substantially simultaneously.

8. A work holder for fixedly positioning a predetermined number of duplicate parts disposed in side-by-side relation longitudinally of an operating station comprising a fixed abutment extending longitudinally of the operating station adjacent one side thereof, longitudinally extending supporting structure adjacent the opposite side of said station having transversely opposite wall portions apertured in transverse horizontal alignment, duplicate clamping members corresponding in number to the number of parts which may be stationed at said operating station each including a clamping shoe and guide rod means projecting normally therefrom, said guide rod means being adapted to be loosely received in said apertures to support said clamping shoes for reciprocatory movement toward and from the fixed abutment and said apertures being positioned longitudinally of the supporting structure individually to align the clamping shoes in a transverse direction with the position assumed by the individual parts at said station, yieldable means to extend the clamping members individually into engagement with the parts at said station with sufficient force to clamp the said parts firmly against said fixed abutment, and means to retract said duplicate clamping members substantially simultaneously.

9. A work holder for fixedly positioning a predetermined number of duplicate parts disposed in side-by-side relation longitudinally of an operating station comprising a fixed abutment extending longitudinally of the operating station adjacent one side thereof, a channel on the opposite side of said station having its flanges vertically disposed and apertured in transverse alignment, duplicate clamping members corresponding in number to the number of parts which may be stationed at said operating station each including a clamping shoe and guide rod means projecting normally therefrom, said guide rod means being adapted to be loosely received in said apertures to support said clamping shoe for reciprocatory movement toward and from said fixed abutment and said apertures being positioned longitudinally of said channel individually to align the clamp shoes in a transverse direction with the individual parts at said station, fixed stops on a portion of each of the guide rod means positioned between the flanges of said channel, expansion springs reacting between said stops and one of the flanges of said channel yieldably and independently to urge the clamp shoes into engagement with the parts at said operating station with a force sufficient to clamp the said parts firmly against said fixed abutment, crossbar structure slidably mounted relative to said guide rod structure between said stops and the other of the flanges of said channel, and means to draw said crossbar structure into abutting engagement with said stops substantially simultaneously and with sufficient force to retract all of said duplicate clamping members to inoperative position.

10. A work positioning and holding mechanism for a machine having mechanism including a rockable shaft to bring an operating head and a plurality of duplicate parts at an operating station in the machine into and out of operating relationship, comprising opposed positioning and clamping members disposed to locate the same on opposite sides of a series of duplicate parts at said operating station and movable relatively toward and from each other including members individual to the said parts on at least one side thereof, means for moving the clamping members into clamping position including yieldable means independently to urge the individual clamping members to clamping position, means to move said individual clamping members in opposition to said yieldable means substantially simultaneously to release all of said clamped parts, and means to actuate said clamping member releasing means in response to rocking movement imparted to the rockable shaft by predetermined movement of the operating head.

11. A work positioning and holding mechanism for a machine having mechanism including a rockable shaft to bring an operating head and a plurality of duplicate parts at an operating station in the machine into and out of operating relationship, comprising opposed positioning and clamping members disposed to locate the same on opposite sides of a series of duplicate parts at said operating station and movable relatively toward and from each other including members individual to the said parts on at least one side thereof, means for moving the clamping members into clamping position including yieldable means independently to urge the individual clamping members forwardly to clamping position, forwardly and rearwardly movable retracting means having a connection with each of said individual clamping members effective to retract the same upon rearward movement of the said retracting means, a cable to retract said retracting means in response to a rearwardly directed pull thereon, and means operated by said rockable shaft for exerting a rearwardly directed pull on the cable in response to the rocking movement imparted to the rockable shaft when the operating head and duplicate parts are moved relatively in a predetermined direction.

12. A positioning and holding mechanism for a machine having mechanism including a rockable shaft to bring an operating head and a plurality of duplicate parts at an operating station in the machine into and out of operating relationship, comprising opposed positioning and clamping members disposed to locate the same on opposite sides of a series of duplicate parts at said operating station and movable relatively toward and from each other including members individual to the said parts on at least one side thereof, means for moving the clamping members into clamping position including yieldable means constantly to urge the individual clamping members to clamping position, retracting means constrained for movement in a direction corresponding to the direction of movement of said individual clamping members and having a lost motion connection therewith effective to vary the extent of permissible movement of the said individual clamping members under the influence of said yieldable means, and means operated by said shaft to take up lost motion between said retracting means and individual clamping members and move the latter to inoperative position in response to rocking movement imparted to the rockable shaft when the operating head and duplicate parts are moved out of operating relationship.

13. In a machine for simultaneously operating upon a plurality of duplicate parts disposed in side-by-side relation longitudinally of an operating station in the machine, a work holder comprising cooperating relatively movable clamping means including yieldable members individually to apply clamping force to the individual parts at said operating station, a shaft mounted for limited rocking and axial movement, an operatting head supported by said shaft for rocking movement into and out of operating relationship with the parts at said station and for axial movement to adjust the position of said head in a forward and rearward direction relative to the said parts, means to bias said shaft and head toward a predetermined position, means for releasing said clamping means including means for opposing said yieldable members substantially simultaneousy, and means operated by said shaft to actuate said yieldable member opposing means in response to rocking movement imparted to the shaft by predetermined rocking movement of said operating head.

14. In a machine for simultaneously operating upon a plurality of duplicate parts disposed in side-by-side relation longitudinally of an operating station in the machine, a work holder comprising cooperating relatively movable clamping means including yieldable members individually to apply clamping force to the duplicate parts at said operating station, a shaft mounted for limited rocking and axial movement, an operating head supported by said shaft for rocking movement into and out of operating relationship with the parts at said operating station and for axial movement to adjust the position of said head in a forward and rearward direction relative to the said parts, means for releasing said clamping means including means for opposing said yieldable members substantially simultaneously, means operated by said shaft to actuate said yieldable member opposing means upon predetermined rocking movement of the operating head, and opposed counterbalancing springs lightly to bias said head to inoperative position and to center the same in a forward and rearward direction relative to the operating station.

15. In a machine for simultaneously operating upon a plurality of duplicate parts, means including a gravity feed conveyor system divided into loading, operating and discharge stations, a terminal stop against which duplicate parts may be gravitationally backed up side-by-side from the discharge station to the loading station, said operating and discharge stations being of predetermined length so as to support thereon a predetermined number of backed up duplicate parts, an operating head to operate on the duplicate parts at said operating station substantially simultaneously, means for fixedly but releasably holding a plurality of duplicate parts at said operating station in a predetermined position relative to the operating head including yieldable members individually to apply clamping force to the duplicate parts, means for relatively moving said operating head and the duplicate parts at said operating station into and out of operating relationship, and means for simultaneously rendering said yieldable members operative and inoperative upon predetermined relative movement of the said duplicate parts and operating head.

16. In a machine for simultaneously operating upon a plurality of duplicate parts, means including a gravity feed conveyor system divided into loading, operating and discharge stations, a plurality of legs to support said conveyor system, certain of said legs being vertically adjustable to vary the end-to-end inclination of the conveyor system or accommodate for variations in the level of the terrain on which said machine is stationed, a terminal stop against which duplicate parts may be gravitationally backed up side-by-side from the discharge station to the loading station, said operating and discharge stations being of predetermined length so as to support thereon a predetermined number of backed up duplicate parts, an operating head to operate on the duplicate parts at said operating station substantially simultaneously, means for fixedly but releasably holding a plurality of duplicate parts at said operating station in a predetermined position relative to the operating head including yieldable members individually to apply clamping force to the duplicate parts, means for relatively moving said operating head and the duplicate parts at said operating station into and out of operating relationship, and means for simultaneously rendering said yieldable members operative and inoperative upon predetermined relative movement of the said duplicate parts and operating head.

References Cited in the file of this patent

UNITED STATES PATENTS

| | | | |
|---|---|---|---|
| 541,788 | Kales | June 25, | 1895 |
| 648,138 | Adams et al. | Apr. 24, | 1900 |
| 1,456,029 | Mills et al. | May 22, | 1923 |
| 1,562,680 | Bohn | Nov. 24, | 1925 |
| 2,298,921 | Barker | Oct. 13, | 1942 |
| 2,611,523 | Aines | Sept. 23, | 1952 |
| 2,613,788 | McLaughlin | Oct. 14, | 1952 |